Figure 1:
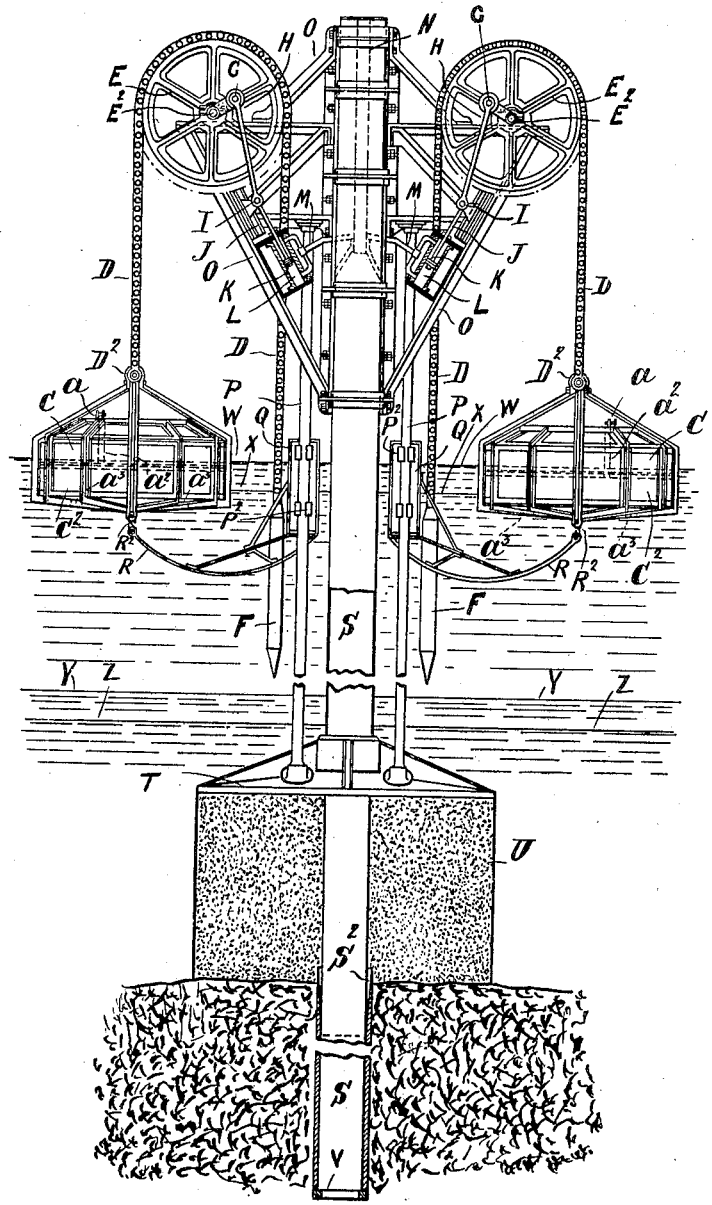

No. 827,639. PATENTED JULY 31, 1906.
J. HUTCHINGS.
MEANS AND APPARATUS EMPLOYED IN GENERATING MOTIVE POWER FROM WAVES, TIDES, OR THE LIKE MOVEMENTS OF WATER.
APPLICATION FILED DEC. 4, 1905.

No. 827,639. PATENTED JULY 31, 1906.
J. HUTCHINGS.
MEANS AND APPARATUS EMPLOYED IN GENERATING MOTIVE POWER FROM WAVES, TIDES, OR THE LIKE MOVEMENTS OF WATER.
APPLICATION FILED DEC. 4, 1905.
2 SHEETS—SHEET 2.
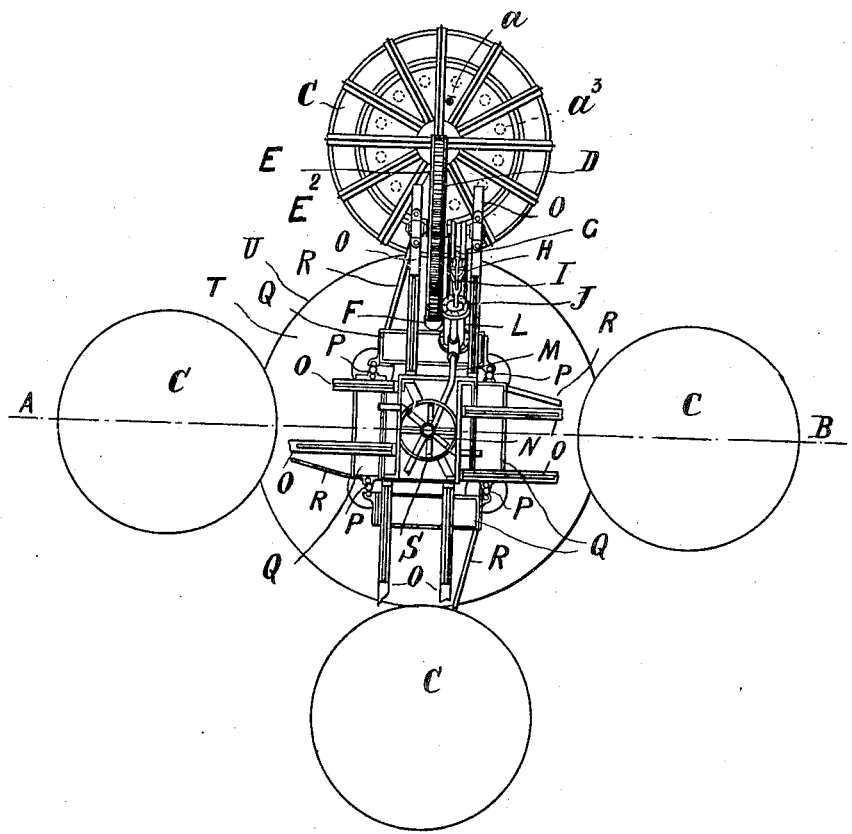
FIG. 2.
FIG. 3.
Witnesses:
Inventor
John Hutchings
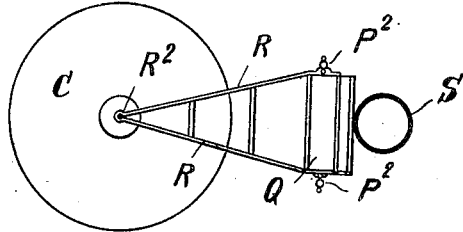

UNITED STATES PATENT OFFICE.

JOHN HUTCHINGS, OF LONDON, ENGLAND.

MEANS AND APPARATUS EMPLOYED IN GENERATING MOTIVE POWER FROM WAVES, TIDES, OR THE LIKE MOVEMENTS OF WATER.

No. 827,639.

Specification of Letters Patent.

Patented July 31, 1906.

Application filed December 4, 1905. Serial No. 290,239.

*To all whom it may concern:*

Be it known that I, JOHN HUTCHINGS, engineer, a subject of the King of Great Britain, residing at 210 Moorgate Station, Chambers, Moorfields, in the city of London, England, have invented certain new and useful Improvements in Means and Apparatus Employed in Generating Motive Power from Waves, Tides, or the Like Movements of Water, of which the following is a specification.

This invention relates to means and apparatus employed in generating motive power from the movements of waves, tides, or the like movements of bodies of water, such as the ocean, inland seas, river estuaries, tidal rivers, and lakes, acting on floating buoys and water-compartments or the like hung to a central column securely fixed to the bottom of the sea or secured in analogous position.

A convenient form of apparatus embodying this invention is shown by the drawings, in which—

Figure 1 is a section taken on the line A B, Fig. 2. Fig. 2 is a plan view, but showing only one of the suspended power-buoys, the positions only being shown of the others. Fig. 3 is a plan view of the brackets and other parts.

The power plant shown has four suspended power-generating buoys C C C C, with their subtended water-tanks $C^2 C^2$.

D D are chains which may be of plate link or other type.

E E are sprocket or pulley wheels.

F represents weights; G, crank-pins; H, connecting-rods; I, slide-bars or heads; J, piston-rods; K, pistons; L, the cylinders; M N, conducting-pipes; O, framed and braced brackets; P, guide-bars; R, anchor-brackets.

S is a tubular supporting-column; T, base cap-plate; U, shell or tank of the concrete base.

V designates the diamond-crown boring-head; W, the line of high spring tides; X, the line of high neap tides; Y, the line of low neap tides, and Z the lint of low spring tides.

The said apparatus consists, mainly, of the central column S and the above-cited parts in suitable arrangement.

The above structure having been erected, the generation of power is effected by fixing the buoys C, in conjunction with the anchor-buoys Q and their anchor-brackets R, pulley-wheels E, the chains D, and weights F, into their working positions.

Each power-buoy C is made with air-tight joints and onto its bottom is subtended a water-compartment $C^2$. A pipe $a^2$ (shown in dotted lines) is attached to the cock or valve $a$ and fitted with air-tight joints to extend down through the bottom of each buoy C to communicate with the water-compartment $C^2$. By opening the valve $a$ air is allowed to escape from the water-compartment $C^2$ through the pipes $a^2$, when water is admitted in its place through the bottom apertures $a^3$ until sufficient water has been admitted to make the weight of water plus the weight of the material forming the power-buoy C, including any part of the weight of the anchor-brackets R, which may depend or hang onto the bottom of the water-compartment $C^2$, equal to more than that of the weight F and chain D, including any extra weight required in F or the power-buoy C to overcome any friction during working of the wheel E and the chain D. The material forming the said buoy C, the chain D, and anchor-brackets R, resting on the said buoy C, are equal in weight to the buoyancy obtained by the confined air in the said buoy C. When the said buoys C have been sunk to their working depth, the connecting-chains D are attached to the top of these buoys C by means of the universal shackle-joints $D^2$, thence carried over the pulley-wheels E and down and affixed to the suspended weight F. The chain D is fixed onto and to travel over the toothed periphery of the sprocket-wheels E, which may revolve to and fro on their axle-shafts $E^2$, actuated by means of any up or down wave or tide movements affecting the power-buoys C. To effect proper control by these buoys C of any reciprocating or simultaneously responding up or down movement of the weights F and at the same time to generate power, it is necessary that the falling weight of the combined buoy C and water-compartment $C^2$ should be equal to more than that of the weight F plus the weight absorbed by friction in the working of the chain D and the wheel F, and that the buoyancy of the buoy C should be correspondingly equal to the whole falling weight of the combined buoy C and water-compartment C² plus the buoyancy absorbed by any friction of the chain D, working over and in conjunction with the pulley-wheels E. This balancing is necessary if an equality of pressure is to be attained in the compression or pumping cylinders L L.

When the power-buoy C and its subtended water-compartment C² falls into a trough between waves in water, it lifts the weight F upward by means of the connected chain D a vertical height equal to the vertical depth of such fall of the buoy C, actuated by waves or tides. The balance of the falling weight of this buoy C and water-compartment C² left after overcoming the lifting of the weight F is used or absorbed through the sprocket-wheels E E, crank-rods H, piston-rods J, pistons K K, moving reciprocally in the cylinders L, generating power by compressing air or pumping water through the cylinders L L. The pressure of the pistons K against such water or air in the cylinders L will be equal (less or minus the friction of the machinery) to the remaining or unabsorbed portion of the falling weight of the combined power-buoy C and its water-compartment C². When the power-buoy C and water-compartment C² are lifted by wave or tide movements from a position in a trough between waves in water to a position on the crest or top of a wave, the weight F, being held to the power-buoy C by means of the chains D, running over the pulley-wheels E, descends a vertical depth equal to the vertical height the buoy C may thus be lifted. During the descending movement of the weight F (caused by the ascending movement of the buoy C) the pressure in the cylinder L will be equal to the weight F less the pressure absorbed by the friction of the moving working parts of the machinery engaged. This up-and-down movement of the power-buoys C C, actuating the chain D, causes the pulley-wheels E and their crank-pins G to rotate more or less whole or parts of cycles or oscillate to and fro, according to the height of the generating waves or tides, thereby forcing the connected crank-rods H, the slide-blocks or cross-heads I I, the piston-rods J J, the pistons K K to and fro reciprocally within the double-acting cylinders L L, through suitable valves into the conducting-pipes M N, thence to a point where such fluid may be conserved and ultimately used.

Onto the anchor-bracket controlling buoys Q the anchor-brackets R are fixed to extend underneath the bottom of the water-compartments C² and the power-buoys C, which buoys are thus held and anchored to their working positions by anchor-brackets R and ropes R². The anchor-buoys Q are fixed and held to vertical guide-rods P by guide-brackets P², so attached that the anchor-buoys Q may move and work freely up or down (out of the way of the power-buoys C) in their fixed working positions around the tubular column S, while suspended brackets R are projected downward at a sufficient depth below the bottom of the water-compartment C² to be quite out of the way while the buoys C are being lifted or lowered or tossed by waves or tides into varying positions or angles from the horizon while being held in a working position by the anchor-brackets R and the connections R². The tubular column S may be bored into the bottom until a satisfactory foundation has been secured, when the column is wedged up tightly thereto by means of a ferrule wedge or tubular wedge-piece S², inserted into S. The column S may also be supported by a concrete base laid within an iron tank U, circumscribing the base of said column S on the bottom covered by a capping-plate T.

The construction of the superstructure of the apparatus is effected by framing together the brackets O and screw-bolting same onto the column S.

The brackets O may be fixed to already existing docks, walls, piers, harbors, quays, rocks, or the like places against or projecting into the sea wheresoever it may be possible or desirable to generate motive power from the sea or in other waters. The applicability of this particular motive-power generator to a varied number of working situations is therefore obvious.

Having now particularly described and ascertained the nature of my said invention and in what manner the same is to be performed, I declare that what I claim is—

1. An apparatus of the character described, comprising a support, a plurality of elements for developing motive power carried by said support, pulleys rotatably connected with said support, valved floating chambers, counterbalanced weights, flexible connections passing over said pulleys and connected at one end to said chambers and at the other end to said weights, connecting devices between said pulleys and said elements for converting the circular motion of the pulleys into a reciprocating motion of the said elements, subsidiary floats slidably connected with said support, and mooring connections between the floating chambers and the subsidiary floats.

2. An apparatus of the character referred to, comprising a vertical support fixed at its lower end, laterally-projecting supporting members attached to said vertical support, an element mounted upon each of said members and adapted to develop motive power, a pulley rotatably connected to each of said members, floating chambers, counterbalance-weights, flexible connections passing over said pulleys and attached at one end to said chambers and at the other end to the weights, connecting devices between the said elements and the said pulleys for converting the circular motion of the pulleys into a reciprocating motion of the compressors, subsidiary floats slidably connected with said vertical support and mooring connections between said chambers and said subsidiary floats.

In testimony whereof I have hereunto set my hand in presence of two subscribing witnesses.

JOHN HUTCHINGS.

Witnesses:
ALFRED GEORGE BROOKES,
JOHN COODE HORE.